United States Patent [19]

Mahoney et al.

[11] 3,793,183
[45] Feb. 19, 1974

[54] METHOD FOR STARTING UP A REFORMING PROCESS EMPLOYING A CATALYST CONTAINING A GROUP VIII METAL, RHENIUM, AND SELENIUM

[75] Inventors: John A. Mahoney, Park Forest South, Ill.; Thomas D. Nevitt, Valparaiso, Ind.

[73] Assignee: Standard Oil Company, Chicago, Ill.

[22] Filed: Dec. 11, 1972

[21] Appl. No.: 314,134

[52] U.S. Cl.................. 208/134, 208/138, 208/139
[51] Int. Cl............................................ C10g 35/04
[58] Field of Search..... 208/134, 138, 139; 252/439

[56] References Cited
UNITED STATES PATENTS

| | | | |
|---|---|---|---|
| 3,417,157 | 12/1968 | Pollitzer | 252/439 |
| 3,449,237 | 6/1969 | Jacobson et al. | 208/138 |
| 3,471,412 | 10/1969 | Miale et al. | 252/439 |
| 3,558,477 | 1/1971 | Kluksdahl | 208/138 |
| 3,592,780 | 7/1971 | Rashkin | 208/138 |

*Primary Examiner*—Delbert E. Gantz
*Assistant Examiner*—James W. Hellwege
*Attorney, Agent, or Firm*—James L. Wilson

[57] ABSTRACT

The method comprises treating the catalyst in a reforming zone with a first oxygen-containing gas at a temperature of at least 880°F.; subsequently treating the catalyst with a second oxygen-containing gas; after purging the reforming zone with an inert gas, treating the catalyst with a hydrogen-containing gas while cooling the average catalyst temperature to a temperature of about 700°F.; introducing the petroleum hydrocarbon stream to be reformed into the reforming zone at one-half to one of the weight hourly space velocity to be employed during the reforming process; increasing the average catalyst temperature to a temperature of 850°F. at a selected rate; increasing the weight hourly space velocity to that desired for the process; and replacing the hydrogen-containing gas with hydrogen-containing recycle gas.

The first oxygen-containing gas may be air while the second oxygen-containing gas may be essentially pure oxygen.

8 Claims, 1 Drawing Figure

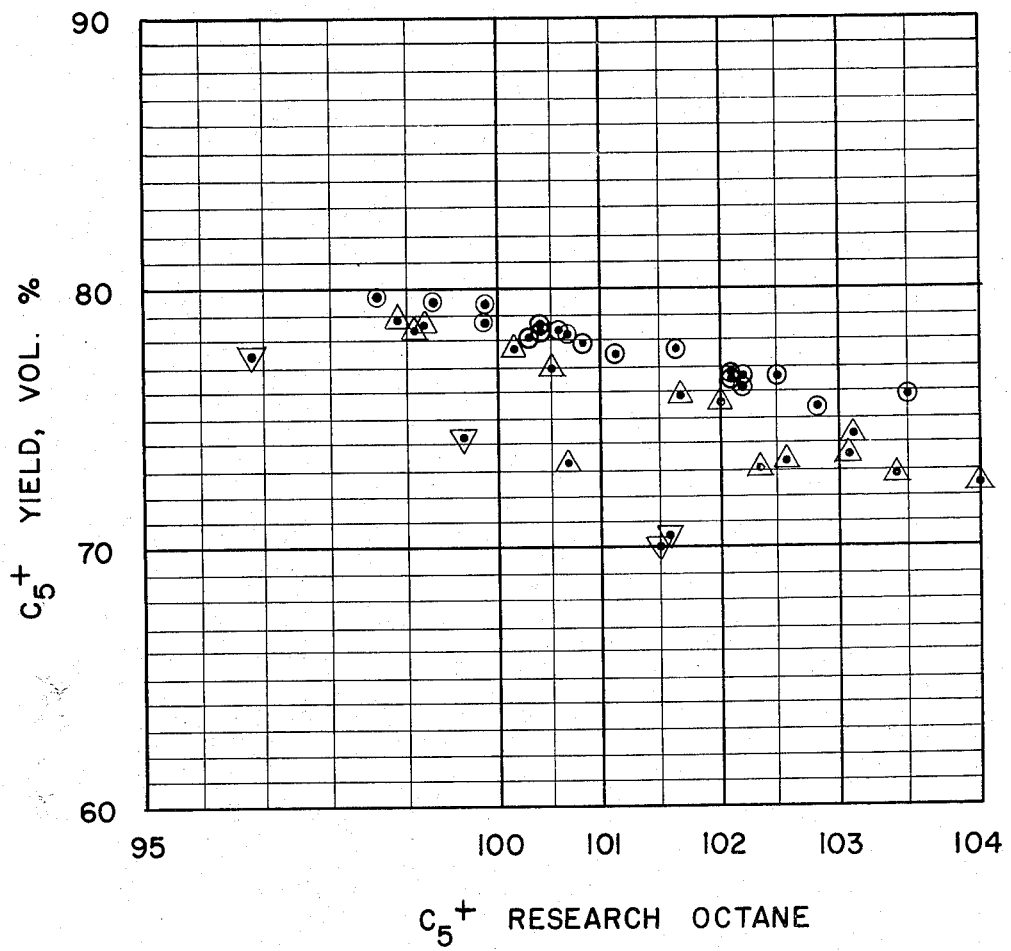

METHOD FOR STARTING UP A REFORMING PROCESS EMPLOYING A CATALYST CONTAINING A GROUP VIII METAL, RHENIUM, AND SELENIUM

BACKGROUND OF THE INVENTION

This invention is related to the conversion of petroleum hydrocarbon streams. More particularly, it is related to a start-up method to be employed in a process for the reforming of petroleum hydrocarbon fractions over a catalyst comprising a Group VIII metal (preferably platinum), rhenium, and selenium supported on a refractory inorganic oxide.

In recent years, improvements have been made in the reforming catalyst field. This is particularly true for catalysts containing a platinum-group metal. Catalysts containing both a platinum-group metal and rhenium possess excessive hydrocracking activity initially, which initial excessive activity can be controlled, if the catalyst is either pre-sulfided or sulfided at the start of the reforming operation. Recently, there has been found a platinum-containing reforming catalyst which contains both rhenium and selenium as catalyst promoters. This catalyst need not be pre-sulfided or sulfided initially while on stream to minimize the initial excessive hydrocracking activity that is obtained with a catalyst containing platinum and rhenium. A process for reforming petroleum hydrocarbon streams, which process employs a catalyst comprising a Group VIII metal, rhenium, and selenium on a refractory-inorganix-oxide support is described in a copending patent application, U.S. Ser. No. 314,133, which was filed concurrently with the present application.

Now it has been found that a reforming process employing a catalyst containing a Group VIII metal, rhenium and selenium on a refractory-inorganic-oxide support can be improved, if the proper start-up method is employed. Such a suitable and advantageous start-up method is presented hereinafter.

SUMMARY OF THE INVENTION

Broadly, in accordance with the present invention, there is provided an improved method for starting up a process for reforming a petroleum hydrocarbon stream in which process said petroleum hydrocarbon stream is reformed in a reforming zone in the presence of a catalyst comprising a Group VIII metal, rhenium, and selenium deposited on a solid catalytic support comprising a refractory inorganic oxide. The method comprises introducing into said reforming zone containing said catalyst at atmospheric pressure and ambient temperature a first oxygen-containing gas at a flow rate of at least 0.1 cubic foot per hour per gram of catalyst; passing said first oxygen-containing gas into and through said reforming zone and rapidly raising the average catalyst temperature from ambient temperature to a temperature of at least 880°F.; when the average catalyst temperature has reached said temperature of at least 880°F., stopping the flow of said first oxygen-containing gas and introducing into said reforming zone a second oxygen-containing gas at a flow rate of about 0.5 cubic foot per hour per gram of catalyst to about 2 cubic feet per hour per gram of catalyst; passing said second oxygen-containing gas into and through said reforming zone for at least 1 hour; stopping the flow of said second oxygen-containing gas and purging said reforming zone with an inert gas; stopping the flow of said inert gas and introducing into said reforming zone a hydrogen-containing gas at a pressure of about 50 psig to about 400 psig and a flow rate of about 0.1 cubic foot per hour per gram of catalyst to about 1 cubic foot per hour per gram of catalyst; passing said hydrogen-containing gas into and through said reforming zone while cooling the catalyst to an average catalyst temperature of about 700°F.; while continuing the flow of said hydrogen-containing gas into said reforming zone, introducing said petroleum hydrocarbon stream into said reforming zone at a weight hourly space velocity (WHSV) that is one-half to one times the WHSV that will be used during said process; while continuing the flows of said hydrogen-containing gas and said petroleum hydrocarbon stream into and through said reforming zone, increasing the average catalyst temperature to a temperature of 850°F. at a rate of about 1°F. per minute to about 5°F. per minute; when the average catalyst temperature has reached 850°F., increasing the WHSV to that desired for said process; replacing said hydrogen-containing gas with hydrogen-containing recycle gas at a flow rate to be used in said process; and increasing the average catalyst temperature at a rate of about 1°F. per minute to about 5°F. per minute until the desired operating average catalyst temperature is obtained.

Air is a preferred first oxygen-containing gas while essentially pure oxygen is a preferred second oxygen-containing gas. However, any oxygen-containing gas having an oxygen partial pressure of 1 atmosphere is a suitable second oxygen-containing gas.

BRIEF DESCRIPTION OF THE DRAWING

One FIGURE accompanies this specification. This FIGURE presents a comparison of reforming yield data obtained from a process employing the start-up method of the present invention to that obtained from a process employing a prior-art start-up method.

DESCRIPTION AND PREFERRED EMBODIMENTS

One of the important petroleum refining processes is the reforming process, which provides motor fuels having very high octane numbers. An example of a superior reforming process is that process which employs a catalyst comprising a Group VIII metal, rhenium, combined chlorine, and selenium deposited on a solid catalytic support comprising a refractory inorganic oxide. This reforming process advantageously employs a catalyst, whether fresh or regenerated, which does not require a sulfiding pre-treatment and does not pose a sulfur-distribution problem. It provides high-octane-number hydrocarbon blending components for gasoline and, as does the typical reforming process, produces aromatics by means of (1) the dehydrogenation of 6-carbon-member-ring naphthenes and the subsequent dehydrogenation of the 6-carbon-member-rings, and (3) the dehydrocyclization of paraffinic hydrocarbons to aromatics.

Broadly, according to the present invention, there is provided a method for starting up a process for reforming a petroleum hydrocarbon stream in which process said petroleum hydrocarbon stream is reformed in a reforming zone in the presence of a catalyst comprising a Group VIII metal, rhenium, and selenium deposited on a solid catalytic support comprising a refractory inorganic oxide. The method employs sequentially two oxygen-containing gases at temperatures of at least 880°F. The method comprises: introducing into said reforming zone containing said catalyst at atmospheric pressure and ambient temperature a first oxygen-containing gas at a flow rate of at least 0.1 cubic foot per hour per gram of catalyst; passing said first oxygen-containing gas into and through said reforming zone and rapidly raising the average catalyst temperature from ambient temperature to a temperature of at least 880°F.; when said average catalyst temperature has reached said temperature of at least 880°F., stopping the flow of said first oxygen-containing gas and introducing into said reforming zone a second oxygen-containing gas at a flow rate of about 0.5 cubic foot per hour per gram of catalyst to about 2 cubic feet per hour per gram of catalyst; passing said second oxygen-containing gas into and through said reforming zone for at least 1 hour; stopping the flow of said second oxygen-containing gas and purging said reforming zone with an inert gas; stopping the flow of said inert gas and introducing into said reforming zone a hydrogen-containing gas at a pressure of about 50 psig to about 400 psig and a flow rate of about 0.1 cubic foot per hour per gram of catalyst to about 1 cubic foot per hour per gram of catalyst; passing said hydrogen-containing gas into and through said reforming zone while cooling the catalyst to an averge catalyst temperature of about 700°F.; while continuing the flow of said hydrogen-containing gas into said reforming zone, introducing said petroleum hydrocarbon stream into said reforming zone at a WHSV that is about one-half to one times the WHSV that will be used during said process; while continuing the flows of said hydrogen-containing gas and said petroleum hydrocarbon stream into and through said reforming zone, increasing the average catalyst temperature to a temperature of 850°F. at a rate of about 1°F. per minute to about 5°F. per minute; when the average catalyst temperature has reached 850°F., increasing the WHSV to that desired for said process; replacing said hydrogen-containing gas with hydrogen-containing recycle gas at the flow rate to be used in said process; and increasing the average catalyst temperature at a rate of about 1°F. per minute to about 5°F. per minute until the desired operating average catalyst temperature is obtained.

The start-up method of the present invention is a method for starting up a reforming process that employs a catalytic composition comprising a Group VIII metal, rhenium, and selenium deposited on a solid catalytic support comprising a refractory inorganic oxide. This catalyst may also contain a combined halogen. A suitable Group VIII metal is a Group VIII noble metal and the preferred Group VIII noble metal is platinum. While the Group VIII metal may be present in an amount from about 0.1 to about 5 weight percent, it is preferably present in an amount of about 0.1 to about 2 weight percent, based on the weight of the catalyst. The rhenium may be present in an amount that is equivalent to the amount of Group VIII metal in the catalyst. If the catalyst contains a combined halogen, the combined halogen will be present in a small amount. Preferably, the combined halogen is chlorine and is present in an amount within the range of about 0.1 to about 5 weight percent, based on the weight of the catalyst. Selenium may be present in the catalyst in a small amount as selenium, a selenium compound, or other selenium-containing substances. Suitably, the selenium is present in an amount of at least 0.005 weight percent, based on the weight of the catalyst and calculated as the element. A maximum of 0.1 weight percent selenium is contemplated.

The catalytic composition that is employed in the reforming process that is started up by the method of the present invention comprises a solid catalytic support. This support may comprise a refractory inorganic oxide, such as catalytically active alumina, titania, boria, silica, or mixtures thereof. The solid catalytic support should be a porous support having a surface area of at least 50 square meters per gram. The surface area may be as large as 700 square meters per gram, or more. The preferred solid catalytic support is catalytically active alumina, such as gamma-alumina or eta-alumina. Such alumina may have a surface area as large as 800 square meters per gram, or more, and an average pore diameter within the range of about 30 Angstroms to about 300 A. Preferably, the alumina may have a surface area of about 150 square meters per gram to about 500 square meters per gram and an average pore diameter of about 100 A. to about 200 A.

The catalytic composition is prepared by incorporating the metals with the carrier at any particular step of the catalyst preparation. The metals may be incorporated into the support while the support material is in the form of a sol or gel. The metal-containing material can then be precipitated. On the other hand, the solid catalytic support can be in the form of a dried and/or calcined solid upon which soluble compounds of the metals are impregnated, individually or conjointly, the impregnated material being dried and/or calcined subsequently.

When the catalyst is to contain a combined halogen promoter, particularly fluorine or chlorine, the combined halogen may be added to the solid catalyst support at any point during the preparation of the catalyst prior to or following the incorporation of the Group VIII metal, rhenium, and selenium into the composition. Alternatively, the halogen may be added to the solid catalyst support or carrier during the impregnation of the support with the metals. An example of this latter technique is represented by the impregnation of the support with chloroplatinic acid.

A reforming catalyst that contains platinum and rhenium on an alumina support is well known in the art, as shown by U.S. Pat. No. 3,415,737 and U.S. Pat. No. 3,434,960. As pointed out in each of these patents, a reforming catalyst containing platinum and rhenium is sulfided initially to reduce or minimize the initial excessive hydrocracking activity that will occur with such a catalyst, when it is either a fresh catalyst or a regenerated catalyst. If excessive hydrocracking occurs when the reforming run is initiated, reduced liquid yields occur as a result of the formation of large amounts of light hydrocarbon gases and coke. The catalyst may be sulfided during its preparation, prior to being used for reforming, or the sulfur may be added to the system during the initial period of the reforming run. Suitable sulfur-containing compounds, such as hydrogen sulfide or dimethyldisulfide, are employed for this sulfiding treatment. Such sulfiding techniques are not infallible and are difficult to control in such a way as to permit a uniform distribution of sulfur, which will result in a uniform distribution of sulfur, which will result in a uniform reduction in hydrocracking activity for the initial operation and subsequent operations following regeneration of the catalyst.

The above disadvantage is eliminated by the catalytic composition employed in the process that uses the start-up method of the present invention. The selenium can be applied to and distributed over the catalyst to provide a catalyst having a selected amount of selenium. A substantial amount of the selenium is retained by the catalyst during the subsequent use of the catalyst for reforming and during subsequent reduction and oxidation steps employed in regeneration of the catalyst. The selected amount of selenium will provide a desirable uniform control of the excessive hydrocracking activity at the start of each reforming run, whether the catalyst is employed as a fresh catalyst or a recently regenerated catalyst. The selenium minimizes the excessive initial hydrocracking activity of the catalyst and, or course, reduces the formation of coke at those points of the run. The catalyst need not be re-treated with selenium after each regeneration. This is a great advantage, since the use of sulfur to control the initial excessive hydrocracking activity of a platinum-and-rhenium-containing catalyst requires that the regenerated catalyst be sulfided prior to the use of that regenerated catalyst for reforming. Such sulfiding treatment exposes the catalyst to the hazards of improper sulfiding during each regeneration cycle.

The reforming process employing the start-up method of the present invention is a process for the reforming of a petroleum hydrocarbon fraction. Such petroleum hydrocarbon fraction is a petroleum distillate which boils in the range of about 70°F. to about 500°F. and, preferably, from about 180°F. to about 430°F. The petroleum hydrocarbon fraction may be a straight-run naphtha, a thermally cracked naphtha, a catalytically cracked naphtha, a hydrogenated naphtha, a hydrocarbon fraction boiling in the gasoline boiling range, or a blend of two or more of these feeds. The gasoline boiling range comprises temperatures of about 120°F. to about 420°F., preferably, about 140°F. to about 380°F. The feedstock should contain substantially no nitrogen and only a very small amount of sulfur, that is, no more than 10 ppm, and, preferably, less than 1 to 2 ppm sulfur. Since many of the above feedstocks may contain appreciable amounts of nitrogen and sulfur compounds, which are deleterious to the catalyst, it is preferred that such feedstocks be subjected to a suitable hydrodesulfurization and/or hydrodenitrogenation treatment, such a hydrofining, prior to use in the reforming process in order to reduce both the sulfur and nitrogen levels to tolerable limits. The hydrofining process may be carried out over a suitable sulfur-resistant catalyst, such as a catalyst containing the oxides and/or sulfides of cobalt and molybdenum on an alumina support, at suitable hydrofining conditions.

The process employing the start-up method of the present invention is a process for reforming a petroleum hydrocarbon fraction, which process comprises contacting said hydrocarbon fraction in a reforming zone under reforming conditions and in the presence of hydrogen with the catalytic composition employed in the present invention. Reforming conditions that may be employed in this process comprise an inlet temperature of about 750°F. to about 1,100°F., a total pressure of about 50 psig to about 1,000 psig, a WHSV of about 0.1 to about 10 weight units of hydrocarbon per hour per weight unit of catalyst, and a recycle gas rate of about 1,000 standard cubic feet of gas per barrel of hydrocarbon (SCFB) to about 20,000 SCFB. Generally the recycle gas is at least 75 volume percent hydrogen. Preferred reforming conditions that are employed in the process comprise an inlet temperature of about 800°F. to about 1,050°F., a total pressure of about 50 psig to about 400 psig, a WHSV of about 0.5 to about 5 weight units of hydrocarbon per hour per weight unit of catalyst, and a recycle gas rate of about 2,000 SCFB to about 10,000 SCFB.

As in the typical reforming process, the catalyst of the present invention becomes coated or covered with a layer of carbonaceous material, referred to as coke. This layer or coating of coke results in a large reduction in the activity of the reforming catalyst. Consequently, the catalyst must be regenerated periodically, such period of time being dependent upon the severity of the reforming operation. When the conditions of the reforming operation are more severe, the lay-down or production of coke is more rapid. Typically, regeneration of the catalyst is achieved by stripping the catalyst of any liquid hydrocarbons with an inert gas, burning the coke from the catalyst by the use of controlled amounts of an oxygen-containing gas, and reducing the catalyst in a hydrogen-containing atmosphere prior to use of the regenerated catalyst for the reforming of the petroleum hydrocarbon stream.

Since temperatures in excess of 900°F. are employed in the presence of oxygen-containing gas streams during a catalyst regeneration, a regenerated catalyst of the type described hereinabove need not require the start-up method of the present invention.

The reforming catalyst may be used in a fixed bed or beds. In such case, the catalyst would be in the form of either pellets or extrudates. However, the catalyst could be employed in a moving-bed type of operation. In addition, the catalyst could be employed in one or more fluidized beds of finely divided catalyst particles.

Today, the typical reforming reactor system, in general, employs fixed beds of catalyst and comprises three or more reactors connected in series. Each reactor, which contains one or more beds of catalyst, may be preceded by a heater to heat the materials entering the reactor to a prescribed temperature. If the system is a regenerative reforming system, a swing reactor is employed. When the catalyst in a particular reactor has been deactivated, that reactor is removed from the reforming system and the catalyst therein is regenerated. The reactor is replaced by the swing reactor, and this replacement enables the reforming process to continue in operation, even though the catalyst in the removed reactor is being regenerated. Such reforming operation is often identified as cyclic reforming.

The start-up method of the present invention is particularly suitable for starting up a reforming process employing a catalyst comprising a Group VIII metal, rhenium, selenium, and a combined halogen deposited on a refractory inorganic oxide, such as a catalytically active alumina.

The start-up method comprises: introducing into the reforming zone containing the catalyst described hereinabove at atmospheric pressure and ambient temperature a first oxygen-containing gas at a flow rate of at least 0.1 cubic foot per hour per gram of catalyst; passing said first oxygen-containing gas into and through said reforming zone and rapidly raising the average catalyst temperature from ambient temperature to a temperature of at least 880°F.; when the average catalyst temperature has reached said temperature of at least 880°F., stopping the flow of said first oxygen-containing gas and introducing into said reforming zone a second oxygen-containing gas at a flow rate of about 0.5 cubic foot per hour per gram of catalyst to about 2 cubic feet per hour per gram of catalyst; passing said second oxygen-containing gas into and through said reforming zone for at least 1 hour; stopping the flow of said second oxygen-containing gas and purging said reforming zone with an inert gas; stopping the flow of said inert gas and introducing into said reforming zone a hydrogen-containing gas at a pressure of about 50 psig to about 400 psig and a flow rate of about 0.1 cubic foot per hour per gram of catalyst to about 1 cubic foot per hour per gram of catalyst; passing said hydrogen-containing gas into and through said reforming zone while cooling the catalyst to an average catalyst temperature of about 700°F.; while continuing the flow of said hydrogen-containing gas into and through said reforming zone, introducing said petroleum hydrocarbon stream into said reforming zone at a WHSV that is about one-half to one time the WHSV that will be used during said process; which continuing the flows of said hydrogen-containing gas and said petroleum hydrocarbon stream into and through said reforming zone, increasing the average catalyst temperature to a temperature of 850°F. at a rate of about 1°F. per minute to about 5°F. per minute; when the average catalyst temperature has reached 850°F., increasing the WHSV to that desired for said process, replacing said hydrogen-containing gas with hydrogen-containing recycle gas at a flow rate to be used in said process; and increasing the average catalyst temperature at a rate of about 1°F. per minute to about 5°F. per minute until the desired operating average catalyst temperature is obtained.

When the first oxygen-containing gas is being passed through the reforming zone, the average catalyst temperature is rapidly increased to a temperature of at least 880°F. The average catalyst temperature should not exceed a temperature of about 1,050°F. Preferably, a first oxygen-containing gas is air. While the second oxygen-containing gas may be either air or any oxygen-containing gas having an oxygen partial pressure of at least 1 atmosphere, it is preferred that it be essentially pure oxygen.

The various operating conditions, such as WHSV and hydrogen-containing gas rate that will be used during the reforming operation fall within those ranges of values presented hereinabove. In addition, the purge with inert gas employed in the start-up method of the present invention may use any standard purging techniques known to those skilled in the art. The hydrogen-containing gas used in the start-up method should contain a substantial amount of hydrogen. Preferably, the hydrogen-containing gas should be at least 60 volume percent hydrogen.

The start-up method of the present invention is considered to be a high-temperature start-up method. A preferred embodiment of this method is presented in Example I hereinbelow. A prior-art start-up method, employing a lower temperature, is presented in Example II. After several regenerations were performed on the catalyst in Example II, data were obtained. These latter data are presented to show the effect of such regeneration on the forming process.

The examples are presented for purpose of illustration only and are not intended to limit the scope of the invention.

EXAMPLE I

A catalyst containing platinum, rhenium, combined chlorine, and selenium was prepared in the laboratory.

A catalyst containing 0.56 weight percent platinum, 0.51 weight percent rhenium, and 0.79 weight percent combined chlorine on a gamma-alumina catalyst support was manufactured by and obtained from the American Cyanamid Company. A 100-gram portion of this material was impregnated with 120 milliliters of an aqueous solution that contained 0.048 gram of $H_2SeO_4$ and 0.3 milliliter of concentrated hydrochloric acid. The impregnated material was dried in air at a temperature of 40°C. (104°F.), subsequently heated for 16 hours under a heat lamp at a temperature of about 70°C. (158°F.), and finally calcined in air for 2 hours at a temperature of 450°C. (842°F.). The calcined material, hereinafter identified as Catalyst A, was found to contain 0.56 weight percent platinum, 0.51 weight percent rhenium, 0.012 weight percent selenium, and 0.81 weight percent combined chlorine on a gamma-alumina support.

A 15-gram portion (24 cubic centimeters) of Catalyst A (14–20-mesh material) was charged to a reactor that had been fabricated from a one-half-inch schedule 80 Hasteloy pipe. The length of the reactor was 40 inches. The bed of Catalyst A contained about 25 cubic centimeters of the catalyst and occupied a space of about 7 inches midway along the length of the reactor. The catalyst bed was supported by 16 inches of 1/16-inch Heli-Pak 3012 stainless steel packing and the upper or preheat section of the reactor was filled with 4 inches of Heli-Pak stainless steel packing. The temperature along the length of the catalyst bed was measured by means of a co-axial thermowell. The effective cross-sectional area of the reactor was about 1.42 square centimeters. The reactor was surrounded by electrically-heated wire.

The following start-up procedure was employed.

Air was introduced into the system at a flow rate of about 2 cubic feet per hour and the average catalyst bed temperature was raised to a temperature of about 880°F. to about 900°F. Then air was blocked in overnight. The next morning, bottled oxygen was passed through the reactor system at a temperature of about 800°F. to about 900°F. and a flow rate of about 12 cubic feet per hour. The reactor was then purged with nitrogen at atmospheric pressure and at a low flow rate for 10 minutes. Subsequently, the reactor system was pressured in hydrogen to a pressure of 200 psig and the catalyst was treated with flowing hydrogen for one hour and 35 minutes at a flow rate of about 0.1 of a cubic foot per minute. The reactor was cooled from 880°F. to 700°F. Feedstock was introduced into the system at a WHSV that was about one-half of the value that was to be used during the subsequent test. The average catalyst bed temperature was raised at a rate of about 50°F. every 15 minutes until the temperature of 850°F. was obtained. Adjustments were made for any hot spots that were observed in the catalyst bed. When the average catalyst bed temperature was 850°F., the WHSV was increased to the desired WHSV, external hydrogen was stopped, and recycle gas was introduced into the system. The temperature was then increased at a rate of 50°F. every 15 minutes until the operating average catalyst bed temperature was achieved.

The reactants, Feedstock No. 1 and hydrogen, the latter being in recycle gas, were passed down-flow through the reactor of this small-scale laboratory test unit and the effluent from the reactor was passed through a gas-liquid separator. The liquid was passed through a pressure reducing value and was collected in a flask that was cooled by freezing water. A portion of the uncondensed gas was recycled while the remainder was passed into an ice trap, a sampling bomb, and subsequently through a wet test meter. The properties of Feedstock No. 1 are presented hereinbelow in Table I.

TABLE I

FEEDSTOCK PROPERTIES

| Feedstock No. | 1 | 2 | 3 |
|---|---|---|---|
| Gravity, °API | 56.7 | 56.4 | 53.5 |
| Unleaded Research Octane No. | 52.1 | 55.0 | 48.7 |
| Hydrocarbon type, Vol.% | | | |
| Paraffins | 51.8 | 50.7 | 48.0 |
| Naphthenes | 35.5 | 35.2 | 40.4 |
| Aromatics | 12.7 | 14.1 | 11.6 |
| ASTM Distillation, °F. | | | |
| IBP | 140 | 138 | 172 |
| 10% | 220 | 218 | 222 |
| 30% | 242 | 238 | 246 |
| 50% | 256 | 253 | 276 |
| 70% | 270 | 270 | 310 |
| 90% | 296 | 290 | 350 |
| EBP | 352 | 320 | 390 |

Typical operating conditions for the test comprised a liquid hourly space velocity (LHSV) of 1.76 volumes of hydrocarbon per hour per volume of catalyst (a WHSV of 2.12 weight units of hydrocarbon per hour per weight unit of catalyst), a reactor pressure of 200 psig, an average catalyst temperature that was maintained in the range of about 916°F. to about 921°F., and a recycle gas rate of approximately 4,600 SCFB. The results of this are presented in Table II. Relative activity values were calculated for each sample by means of an Arrhenius-temperature-unleaded-octane-number relationship.

EXAMPLE II

In this example, a catalyst containing 0.76 weight percent platinum, 0.51 weight percent rhenium, 0.56 weight percent combined chlorine, and 0.012 weight percent selenium on a gamma-alumina catalyst support was prepared in the laboratory. This catalyst is hereinafter identified as Catalyst B.

A quantity of a platinum-containing reforming catalyst manufactured by the American Cyanamid Company was treated with a rhenium compound to contain 0.5 weight percent rhenium. A 100-gram portion of this rhenium-containing material was then impregnated with 50 milliliters of a solution that contained 0.046 gram of $H_2SeO_4$ (0.025 gram of selenium). The impregnated material was then dried in static air under a heat lamp at a temperature of about 50°C. (122°F.). The dried material was then calcined in static air for 2 hours at a temperature of 450°C. (842°F.).

TABLE II

| Sample No. | 1 | 2 | 3 | 4 | 5 | 6 | 7 | 8 | 9 | 10 | 11 | 12 |
|---|---|---|---|---|---|---|---|---|---|---|---|---|
| DATA OBTAINED WITH CATALYST A | | | | | | | | | | | | |
| Time Period, Hrs. | | | | | | | | | | | | |
| Start | 0 | 3 | 22 | 27 | 46 | 51 | 70 | 75 | 94 | 99 | 120 | 141 |
| Finish | 3 | 22 | 27 | 46 | 51 | 70 | 75 | 94 | 99 | 120 | 141 | 166 |
| Temperature, °F. | 919 | 917 | 920 | 919 | 920 | 920 | 919 | 920 | 921 | 924 | 921 | 919 |
| Hydrogen Percent | | | | | | | | | | | | |
| In Recycle Gas | — | 66.7 | 70.0 | 76.0 | — | 77.3 | 78.1 | 77.4 | 78.2 | 77.5 | 79.3 | 78.7 |
| On Product | — | 2.68 | 2.82 | 3.02 | — | 2.93 | 2.96 | 2.91 | 2.95 | 2.93 | 2.95 | 2.86 |
| $C_5$+ Product | | | | | | | | | | | | |
| Vol% On Feed | — | 70.9 | 71.7 | 75.9 | 75.4 | 76.6 | 76.4 | 76.6 | 76.8 | 76.1 | 77.7 | 77.5 |
| Vol% Aromatics | 87.4 | 86.0 | 85.4 | 83.0 | 81.8 | 80.1 | 79.3 | 79.9 | 79.2 | 79.6 | 79.1 | 77.7 |
| Research Octane (unleaded) | 104.6 | 104.7 | 104.2 | 103.5 | 102.8 | 102.5 | 102.1 | 102.2 | 102.1 | 102.2 | 101.7 | 101.2 |
| Heavy Reformate Research Octane (unleaded) | 108.2 | 110.7 | 110.7 | 110.9 | 108.7 | 108.2 | 107.5 | 107.5 | 107.6 | 107.3 | 106.9 | 106.8 |
| Product Recovery | — | 100.5 | 99.0 | 98.5 | — | 100.1 | 99.7 | 100.3 | 100.3 | 100.5 | 100.6 | 97.8 |
| Catalyst Activity | — | 437 | 343 | 290 | 231 | 218 | 195 | 201 | 184 | 180 | 170 | 159 |

| Sample No. | 13 | 14 | 15 | 16 | 17 | 18 | 19 | 20 | 21 | 22 | 24 | 25 |
|---|---|---|---|---|---|---|---|---|---|---|---|---|
| Time Period, Hrs. | | | | | | | | | | | | |
| Start | 166 | 171 | 190 | 195 | 214 | 219 | 238 | 243 | 262 | — | 310 | 334 |
| Finish | 171 | 190 | 195 | 214 | 219 | 238 | 243 | 262 | 267 | — | 334 | 339 |
| Temperature, °F. | 919 | 919 | 919 | 920 | 920 | 920 | 918 | 919 | 919 | 922 | 920 | 920 |
| Hydrogen Percent | | | | | | | | | | | | |
| In Recycle Gas | 78.9 | 78.1 | 78.2 | 77.5 | 78.3 | 79.5 | 80.6 | 79.2 | 79.9 | — | 78.3 | 78.8 |
| On Product | 2.81 | 2.76 | 2.73 | 2.70 | 2.74 | 2.81 | 2.85 | 2.78 | 2.88 | — | 2.62 | 2.59 |
| $C_5$+ Product | | | | | | | | | | | | |
| Vol% On Feed | 77.9 | 78.2 | 78.1 | 78.4 | 78.2 | 78.6 | 79.4 | 78.8 | — | — | 79.5 | 79.8 |
| Vol% Aromatics | 76.7 | 76.0 | 75.9 | 76.2 | 75.8 | 75.5 | 74.8 | 74.9 | 73.9 | 74.0 | 73.4 | 72.0 |
| Research Octane (unleaded) | 100.8 | 100.7 | 100.3 | 100.6 | 100.4 | 100.4 | 99.9 | 99.9 | 99.7 | 99.8 | 99.3 | 98.6 |

TABLE II — Continued

| Sample No. | 13 | 14 | 3 | 4 | 5 | 6 | 19 | 20 | 21 | 22 | 24 | 25 |
|---|---|---|---|---|---|---|---|---|---|---|---|---|
| DATA OBTAINED WITH CATALYST A | | | | | | | | | | | | |
| Heavy Reformate Research Octane (unleaded) | 105.8 | 105.5 | 105.2 | 105.5 | 105.4 | 105.1 | 104.6 | 104.0 | 103.7 | 104.2 | 103.6 | 102.6 |
| Product Recovery | 98.6 | 99.4 | 98.6 | 100.2 | 98.1 | 98.5 | 98.0 | 100.5 | 94.6 | — | — | 100.4 |
| Catalyst Activity | 144 | 144 | 129 | 136 | 131 | 129 | 121 | 117 | 112 | 108 | 104 | 91 |

A 15-gram portion (24–25 cubic centimeters) of Catalyst B (14–20-mesh material) was charged to a reactor as described in Example I and tested in a unit that is similar to the unit that is described in Example I. This catalyst was tested with Feedstock No. 2. The properties of Feedstock No. 2 are presented hereinabove in Table I.

Prior to this test, Catalyst B was subjected to the following start-up procedure.

The average catalyst temperature was raised to approximately 700°F. Bottled air was passed over the catalyst for one hour at 700°F., atmospheric pressure, and a low flow rate. The reactor was blocked in overnight with the catalyst being maintained in an air atmosphere. The following morning, the reactor system was purged with flowing nitrogen for about 5 minutes at atmospheric pressure and at a low flow rate. The unit was then pressured with hydrogen to a pressure of 200 psig and hydrogen was passed through the system at a flow rate of approximately 1 cubic foot per hour for 1½ hours. The feedstock was then introduced into the reactor system at a WHSV that was approximately one-half of the WHSV to be used during the test. The average catalyst temperature as raised at a rate of about 50°F. every 15 minutes until a temperature of 850°F. was obtained. Adjustments were made for any hot spots that developed in the catalyst bed. When the average catalyst temperature became 850°F., the WHSV was increased to the desired WHSV to be employed during the test. External hydrogen was turned off and recycle gas was introduced into the system. The temperature was increased at a rate of about 50°F. every 15 minutes until the desired operating average catalyst temperature was achieved.

The catalyst was then tested with Feedstock No. 2 for 72 hours, during which time six product samples were obtained. The operating conditions included a LHSV of 1.76 volumes of hydrocarbon per hour per volume of catalyst (a WHSV of 2.12 weight units of hydrocarbon per hour per weight unit of catalyst), a total pressure of 200 psig, and a recycle gas rate of 4,500 SCFB. The used catalyst was then regenerated in an oxygen-containing atmosphere, and 38 cubic centimeters of chlorine gas were added to the reactor system during the regeneration treatment. The regenerated catalyst was again tested with Feedstock No. 2 and subsequently received a second regeneration treatment. Then the regenerated catalyst was tested with a heavier feedstock, Feedstock No. 3. Selected properties of Feedstock No. 3 are presented hereinabove in Table I. This heavier Feedstock No. 3 was employed to deactivate the catalyst more rapidly. The regeneration and the testing with Feedstock No. 3 were repeated one more time. In each case, the catalyst was regenerated in an oxygen-containing atmosphere and 38 cubic centimeters of chlorine gas were added to the reactor system during the regeneration treatment. The catalyst, which had now seen four regenerations, was again employed to reform the original feedstock, i.e., Feedstock No. 2. The data obtained during the first reforming test of Catalyst B and the data from the fifth reforming test are presentd hereinbelow in Table III.

TABLE III

| Sample No. | 1 | 2 | 3 | 4 | 5 | 6 | 21 | 22 | 23 | 24 | 25 |
|---|---|---|---|---|---|---|---|---|---|---|---|
| DATA OBTAINED WITH CATALYST B* | | | | | | | | | | | |
| Timer Period, Hrs. | | | | | | | | | | | |
| Start | 0 | 5 | 24 | 29 | 48 | 53 | 0 | 2.5 | 21.5 | 26.5 | 45.5 |
| Finish | 5 | 24 | 29 | 48 | 53 | 72 | 2.5 | 21.5 | 26.5 | 45.5 | 50.5 |
| Temperature, °F. | — | 864 | 883 | 893 | 910 | 912 | — | 870 | 883 | — | 899 |
| Hydrogen Percent In Recycle Gas | — | 62.7 | — | 60.1 | 57.4 | 55.8 | — | 71.6 | 71.4 | 72.4 | 70.4 |
| On Product | — | 1.71 | — | 1.71 | 1.77 | 1.69 | — | 2.12 | 2.15 | 2.17 | 2.23 |
| C$_5$+ Product | | | | | | | | | | | |
| Vol% On Feed | — | 77.4 | — | 74.2 | 70.4 | 70.0 | — | 78.3 | 78.4 | 78.9 | 77.0 |
| Vol% Aromatics | 72.7 | 67.7 | 69.5 | 72.7 | 78.4 | 78.2 | — | 72.9 | 73.1 | 72.3 | 75.2 |
| Research Octane (unleaded) | 99.2 | 96.9 | 97.9 | 99.6 | 101.6 | 101.5 | — | 99.1 | 99.2 | 98.9 | 100.5 |
| Heavy Reformate Research Octane (unleaded) | 103.9 | 102.0 | 102.4 | 104.5 | 107.5 | 107.2 | — | 104.6 | 104.1 | 104.8 | 106.5 |
| Product Recovery | — | 98.5 | — | 99.4 | 100.2 | 101.4 | — | 100.3 | 101.5 | 101.0 | 100.7 |
| Catalyst Activity | — | 310 | 210 | 284 | 223 | 201 | — | 375 | 265 | — | 214 |

*Catalyst Regenerated four times after Sample No. 6. Each regeneration was followed by reforming test. The last test starts with Sample No. 21.

TABLE III (cont'd)

DATA OBTAINED WITH CATALYST B

| Sample No. | 26 | 27 | 28 | 29 | 30 | 31 | 32 | 33 | 34 | 35 | 36 |
|---|---|---|---|---|---|---|---|---|---|---|---|
| Time Period, Hrs. | | | | | | | | | | | |
| Start | 50.5 | 69.5 | 74.5 | 95.5 | 117.5 | 141.5 | 146.5 | 165.5 | 170.5 | 189.5 | 194.5 |
| Finish | 69.5 | 74.5 | 95.5 | 117.5 | 141.5 | 146.5 | 165.5 | 170.5 | 189.5 | 194.5 | 213.5 |
| Temperature, °F. | 898 | 915 | 915 | 932 | 947 | 946 | 946 | 963 | 964 | 979 | 981 |
| Hydrogen Percent | | | | | | | | | | | |
| In Recycle Gas | 71.8 | 71.1 | 71.2 | 70.5 | 68.6 | 68.5 | 68.3 | 67.2 | 69.5 | 67.9 | 67.5 |
| On Product | 2.25 | 2.42 | 2.42 | 2.53 | 2.56 | 2.43 | 2.42 | 242 | 2.43 | 2.35 | 2.25 |
| $C_5+$ Product | | | | | | | | | | | |
| Vol% On Feed | 77.8 | 75.9 | 75.6 | 74.4 | 72.5 | 73.6 | 73.3 | 72.9 | 73.1 | — | 73.3 |
| Vol% Aromatics | 75.4 | 79.9 | 80.5 | 82.9 | 84.6 | 82.4 | 80.6 | 84.0 | 79.4 | 79.6 | 75.8 |
| Research Octane (unleaded) | 100.2 | 101.7 | 102.0 | 103.2 | 104.0 | 103.1 | 102.6 | 103.4 | 102.3 | 102.4 | 100.7 |
| Heavy Reformate | | | | | | | | | | | |
| Research Octane (unleaded) | 106.3 | 107.6 | 108.2 | 109.3 | 114.1 | 109.3 | 108.8 | 109.3 | 108.9 | 108.5 | 106.5 |
| Product | 101.6 | 102.3 | 102.1 | 102.3 | 100.9 | 101.8 | 101.5 | 101.7 | 98.7 | 101.3 | 98.4 |
| Recovery | | | | | | | | | | | |
| Catalyst Activity | 210 | 195 | 208 | 182 | 165 | 129 | 112 | 93 | 70 | 49 | 34 |

The yield data obtained in Example I and in Example II are presented in the accompanying FIGURE. These data show that the yields obtained in Example I, wherein the start-up method of the present invention was employed, are superior to those obtained when the lower-temperature start-up method of Example II were used. However, when the catalyst in Example II was regenerated at a temperature in excess of 900°F., yields comparable to those obtained when the start-up method of the present invention was employed resulted.

These data demonstrate the advantages furnished by the start-up method of the present invention for a reforming process employing a catalyst comprising a Group VIII metal, rhenium, and selenium deposited on a support comprising a refractory inorganic oxide.

What is claimed is:

1. A method for starting up a process for reforming a petroleum hydrocarbon stream in which process said petroleum hydrocarbon stream is reformed in a reforming zone in the presence of a catalyst comprising a Group VIII metal, rhenium, and selenium deposited on a solid catalytic support comprising a refractory inorganic oxide, which method comprises: introducing into said reforming zone containing said catalyst at atmospheric pressure and ambient temperature a first oxygen-containing gas at a flow rate of at least 0.1 cubic foot per hour per gram of catalyst; passing said first oxygen-containing gas into and through said reforming zone and rapidly raising the average catalyst temperature from ambient temperature to a temperature of at least 880°F.; when said average catalyst temperature has reached said temperature of at least 880°F., stopping the flow of said first oxygen-containing gas and introducing into said reforming zone a second oxygen-containing gas at a flow rate of about 0.5 cubic foot per hour per gram of catalyst to about 2 cubic feet per hour per gram of catalyst; and at a temperature of at least 880°F; passing said second oxygen-containing gas into and through said reforming zone for at least 1 hour; stopping the flow of said second oxygen-containing gas and purging said reforming zone with an inert gas; stopping the flow of said inert gas and introducing into said reforming zone a hydrogen-containing gas at a pressure of about 50 psig to about 400 psig and a flow rate of about 0.1 cubic foot per hour per gram of catalyst to about 1 cubic foot per hour per gram of catalyst; passing said hydrogen-containing gas into and through said reforming zone while cooling the catalyst to an average catalyst temperature of about 700°F.; while continuing the flow of said hydrogen-containing gas into said reforming zone, introducing said petroleum hydrocarbon stream into said reforming zone at a WHSV that is about one-half to one times the WHSV that will be used during said process; while continuing the flows of said hydrogen-containing gas and said petroleum hydrocarbon stream into and through said reforming zone, increasing the average catalyst temperature to a temperature of 850°F. at a rate of about 1°F. per minute to 5°F. per minute; when the average catalyst temperature has reached 850°F., increasing the WHSV to that desired for said process; replacing said hydrogen-containing gas with hydrogen-containing recycle gas at a flow rate to be used in said process; and increasing the average catalyst temperature at a rate of about 1°F. per minute to about 5°F. per minute until the desired operating average catalyst temperature is obtained.

2. The method of claim 1 wherein said first oxygen-containing gas is air.

3. The method of claim 1 wherein said second oxygen-containing gas is essentially pure oxygen.

4. The method of claim 1 wherein said second oxygen-containing gas is air.

5. The method of claim 1 wherein said second oxygen-containing gas has an oxygen partial pressure of at least 1 atmosphere.

6. The method of claim 2 wherein said second oxygen-containing gas is essentially pure oxygen.

7. The method of claim 2 wherein said second oxygen-containing gas is air.

8. The method of claim 2 wherein said second oxygen-containing gas has an oxygen partial pressure of at least 1 atmosphere.

* * * * *

UNITED STATES PATENT OFFICE
CERTIFICATE OF CORRECTION

Patent No. 3,793,183      Dated February 19, 1974

Inventor(s) John A. Mahoney and Thomas D. Nevitt

It is certified that error appears in the above-identified patent and that said Letters Patent are hereby corrected as shown below:

Column 4, lines 66 & 67, "distribution of sulfur, which will result in a uniform" should be deleted.

Column 7, line 25, "which" should be -- while --.

Column 8, line 51, "800°F." should be -- 880°F. --.

Column 10, line 9, "this are" should be -- this test are --.

Column 11, TABLE II - Continued, the headings "3, 4, 5 and 6" should be -- 15, 16, 17 and 18 --;
"(unleaded" should be -- (unleaded) --;
The numbers in the line identified "Research Octane (unleaded" are out of line;
line 35, "as" should be -- was --;
TABLE III, "Timer" should be -- Time --.

Column 14, TABLE III (cont'd), under Sample No. 33, "242" should be -- 2.42 --.

Signed and sealed this 22nd day of October 1974.

(SEAL)
Attest:

McCOY M. GIBSON JR.
Attesting Officer

C. MARSHALL DANN
Commissioner of Patents